United States Patent
Pearsall

[15] 3,659,727
[45] May 2, 1972

[54] TABLES FOR STACKING FLEXIBLE WORK

[72] Inventor: Ralph E. Pearsall, Gloucester, Mass.
[73] Assignee: USM Corporation, Boston, Mass.
[22] Filed: Aug. 13, 1970
[21] Appl. No.: 63,518

[52] U.S. Cl. ................................214/6 H, 271/61, 271/88
[51] Int. Cl. .......................................................B65g 57/03
[58] Field of Search.............271/86, 88, 61, 62; 214/6 H, 214/6, 6 D, 6.5

[56] References Cited

UNITED STATES PATENTS

| | | | |
|---|---|---|---|
| 2,608,312 | 8/1952 | Day | 214/334 |
| 3,567,216 | 3/1971 | Zeller | 271/62 R |
| 3,404,882 | 10/1968 | Hecker et al. | 271/61 |
| 3,237,935 | 3/1966 | Becker et al. | 271/62 R |
| 3,446,500 | 5/1969 | Meier | 271/62 R |

FOREIGN PATENTS OR APPLICATIONS 258,793  12/1967  Austria ..............................214/6 H

*Primary Examiner*—Gerald M. Forlenza
*Assistant Examiner*—Robert J. Spar
*Attorney*—Richard A. Wise, Richard B. Megley and Carl E. Johnson

[57] ABSTRACT

A table has its top fitted with two pivotal work supporting members arranged to be tilted into steeper V-relation in response to the accumulation of flexible work pieces thereon. The table is especially adapted to enable fabric pieces of non-uniform mass, for instance hemmed sleeves, to tend to be self-leveling during stacking.

9 Claims, 6 Drawing Figures

Patented May 2, 1972

Inventor
Ralph E. Pearsall
By his Attorney
Carl E. Johnson.

Patented May 2, 1972

TABLES FOR STACKING FLEXIBLE WORK

BACKGROUND OF THE INVENTION

In the apparel trades, it is commonly necessary to stack work pieces of a particular shape, size, color or other classification, and to transfer them in good order from one work station to the next. Certain pieces, especially those of irregular shape and having one portion thicker or more bulky than another, are difficult to stack one upon another while maintaining uniform orientation. The pile quickly becomes irregular and unwieldy, the accumulated thicker portions building heightwise to cause steep tilting of the top surface and probable toppling of the pile so that upper plies double upon themselves. The latter condition is intolerable since rapid processing at a work station usually necessitates manipulation of each piece in spread-out condition.

One of the common ways that fabric work pieces take on uneven mass is by having a hem or marginal fold which may, for instance, have two or more superposed plies. It will be understood that ornamentation, buttons, and/or other formations in addition to mere hemming may characterize work pieces having uneven mass and hence militate against their being stacked uniformly in good quantities.

The term "uneven mass" is herein employed to denote flexible work pieces of generally planar shape, respectively, and which have corresponding portions of greater bulk than the remaining portions thereof.

With increasing mechanization in the garment and apparel industry, one approach to the foregoing problem has been to provide self-leveling devices, sometimes in the form of automatic work supporting elevators which enable successive uppermost single-ply pieces of a stack to be received at substantially the same level. Yet even these devices, though complex and costly, ordinarily can hold only a small number of work pieces of non-uniform mass in a stack before it tends to become an unduly lop-sided pile. Provision of a fixed horizontal table top for receiving successive non-uniform work pieces to be stacked, though probably the least costly approach, lacks capacity to retain more than a few pieces of uneven mass in an ordered pile.

SUMMARY OF THE INVENTION

In view of the foregoing it is an object of this invention to provide an improved work-supporting means for holding in stacked relation flexible work pieces, such as fabric and the like, even though they be of uneven mass.

Another object of the invention is to provide a simple table structure including a top tilting member which is adapted to accommodate stacking of flexible work pieces with their corresponding portions of greater bulk in superposed relation.

To these ends, and in accordance with a feature of the invention, a table top is formed with an opening in a locality disposed to correspond with those portions of the work pieces to be stacked which are of greater bulk, a tiltable planar member at least partly extending into the opening is pivotable about an axis parallel with the table top and adjacent to its opening for supporting the bulkier work piece portions, and another member is pivotally mounted on the table top on the opposite side of the opening from the mentioned axis, the last-mentioned member having a portion overlying the opening and bearing on a free extremity of the tiltable planar member whereby the members may jointly increasingly tilt with respect to the table top to accommodate an increasing stack of the work pieces.

BRIEF DESCRIPTION OF THE DRAWINGS

The foregoing and other features of the invention will now be described with more particularity in connection with an illustrative embodiment and with reference to the accompanying drawings thereof, in which.

DESCRIPTION OF THE PREFERRED EMBODIMENT

Figure 2:
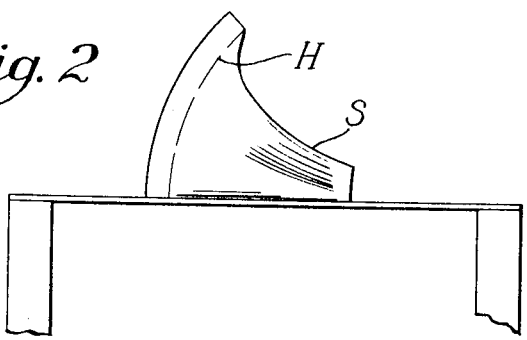
FIG. 2 is a view in side elevation of a conventional work table and indicating, in idealized manner, the maximum stack height which can be supported before the pieces (hemmed, unfinished short sleeves for men's shirts) shift relative to one another so that they can no longer be restrained and will lose their orderly arrangement.

As illustrative of the type of problem dealt with by this invention the stacking of fabric short, unfinished sleeves S will be described, it being understood that they respectively are provided with a hem H along one margin and hence are of uneven mass. This tends to render their orderly stacking difficult since the increased height of the hemmed portions relative to the unhemmed portions causes successive pieces relatively to shift laterally and, before very much accumulation, the hemmed portions tend to and will topple over in folded relation on the remainder of the stack. The improved stacking capacity afforded by the invention is intended to be shown by a comparison of FIG. 3 with the non-tilting table of FIG. 2. It is to be understood, of course, that usage of the invention is not limited to any particular type or shape of work piece, and that various portions of the illustrative embodiment may be modified to accommodate particular work.

Figure 1:
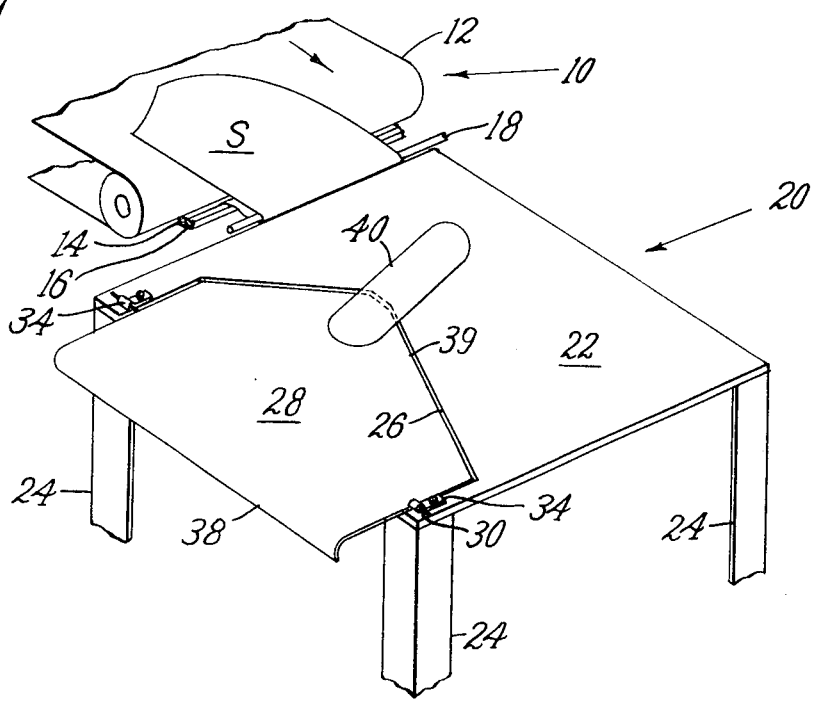
FIG. 1 is a perspective view of the upper portion of a work stacking table showing its tiltable work-supporting members disposed beneath an exemplary work transfer mechanism which is about to deliver the initial flexible work piece of a stack.

Referring to FIG. 1 successive garment sleeves S are assumed to be delivered in outspread condition by a suitable transfer mechanism generally designated 10 forming no part of the present invention but one which may, for instance, comprise an endless conveyor 12, bars 14, 16 cooperative to momentarily clamp one margin of the sleeve S, and a spreader rod 18 that is relatively advanced over a work stacking table 20 with which this invention is especially concerned. It will be understood that the outspread sleeve S will be released by the bars 14, 16 and the rod 18 (or other transfer means) for deposit and stacking on the table 20 which will next be described.

The table 20 has a generally horizontal, fixed top 22 supported by any suitable means such as upright legs 24. An opening 26 (FIGS. 1, 4, 5, 6) in the top 22 is preferably larger than that portion of the work piece having the greater mass, in this case the hem portion H. For supporting the successive bulkier work piece portions H of the sleeves S, a panel 28 is pivotally mounted on a hinge pin 30 extending parallel and adjacent to one edge 32 (FIGS. 4, 5) of the opening 26. For this purpose the pin 30 rotatably extends through brackets 34, 34 (FIGS. 3, 4, 6) secured to the top 22 and is secured to brackets 36, 36 affixed to the panel 28. The arrangement is such that, in unloaded condition as shown in FIG. 6, a counterbalancing outer portion 38 of the panel 28 yieldingly urges its inner end 39, which substantially corresponds in shape to that of the opening 26, upwardly against the underside of another pivotal member 40 disposed on the top 22 and partly overhanging the opening 26. The cooperative relation of the pivotal members 28, 40 is later described. Preferably an end periphery 41 (FIGS. 4, 6) of the member 40 is formed to enable the unloaded panel 28 to assume an initial position which is substantially horizontal.

Figure 4:
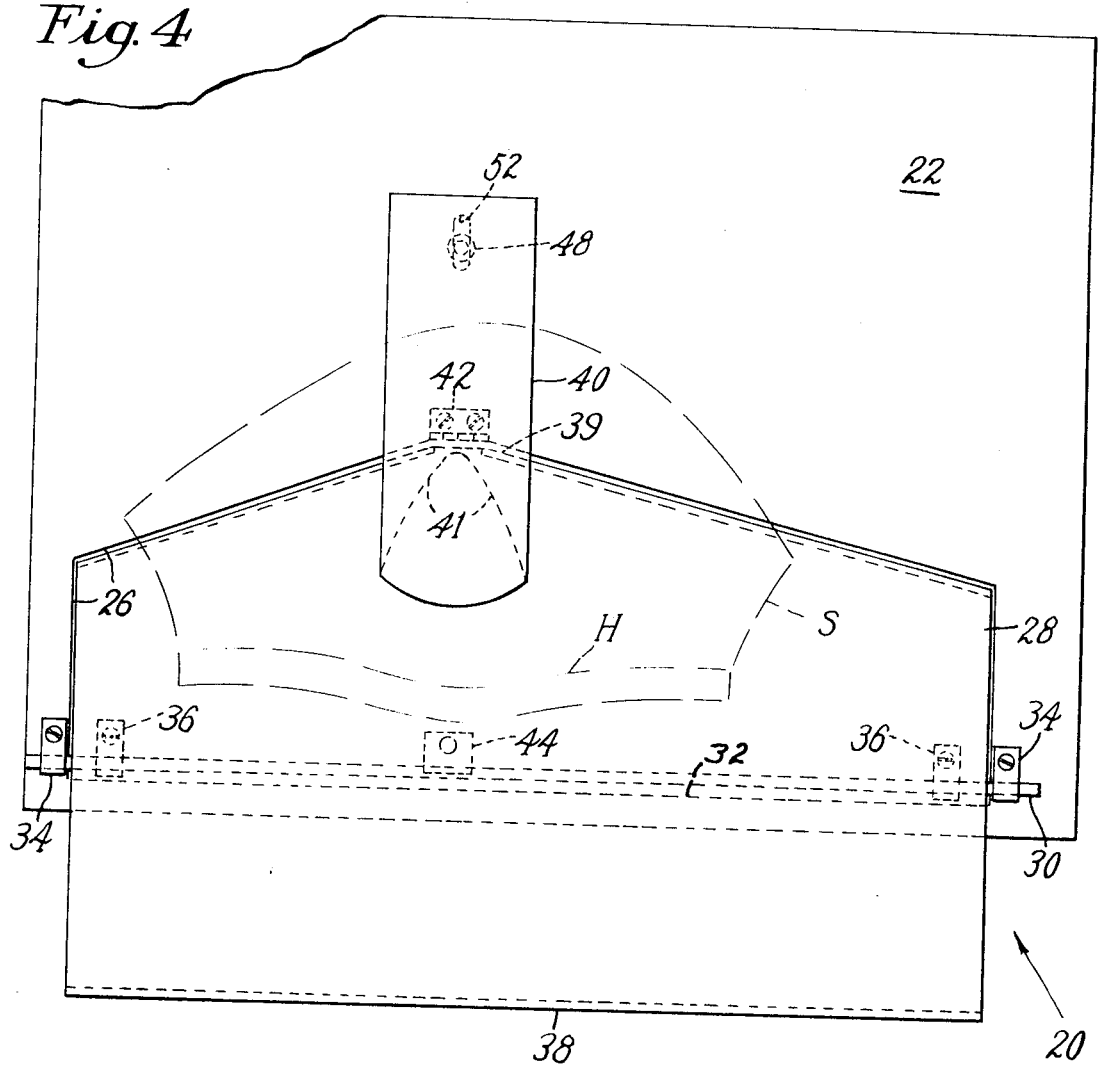
FIG. 4 is an enlarged plan view of the table top shown in FIGS. 1, 3, a deposited shirt sleeve being shown by dash lines.

The member 40 is disposed to centrally support the less bulky portions of the work pieces S as shown in FIG. 4 and is pivotally secured to the table top 22 by a flap hinge 42 having an axis parallel to that of the hinge pin 30. While the member 40 may be of other configuration, it preferably is tubular for several reasons. First, it is easily fabricated and its light weight may suitably complement the panel 28 when the latter is, for instance, of aluminum. Secondly, the member 40 allows widely differing shapes of work pieces such as the successive pieces S to drape themselves over its rounded upper surface in non-rumpled, extended condition thereby centering one on another, avoiding air entrapment, and rendering the whole stack readily removable for subsequent storage or further processing. Thirdly, the upper surface of the member 40 is preferably roughened, for instance coated with a flocculant, to enable it to serve as a friction brake and thus aid in properly locating the first-deposited or lowermost piece S of each stack to be supported.

Figure 3:
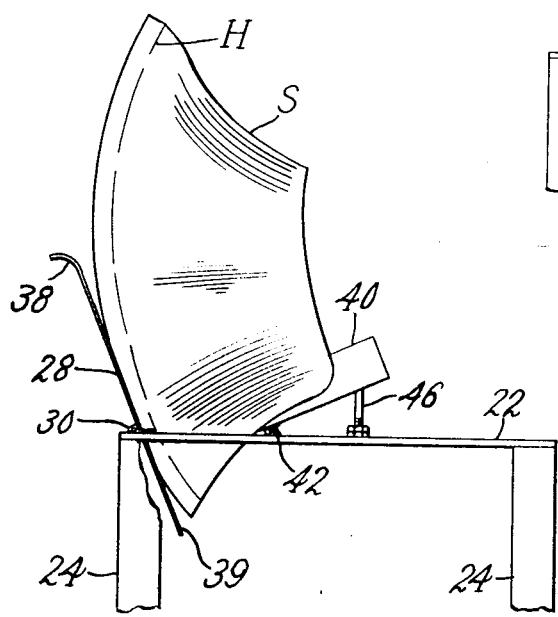
FIG. 3 is a view in side elevation of the table shown in FIG. 1, its tiltable work supporting members being loaded by a transfer mechanism with work pieces such as the hemmed short sleeves of FIG. 2.

The pivotal member 40, like the panel 28, is biased towards assuming a parallel relation to the table top 22. This is to say that the member 40 is so mounted in relation to the hinge 42 that the member of its own weight tends to turn clockwise as viewed in FIG. 6 whereas the panel 28 tends to pivot counterclockwise. As the successive pieces S are deposited jointly on the panel 28 and the member 40, the latter are tilted increasingly away from general parallel relation to the top 22 into a V-formation such as indicated in FIG. 3. In other words they oppositely tilt progressively, the member 40 counterclockwise and the panel 28 clockwise as shown in FIGS. 3, 6, in response to their respective increasing work loads as the stack grows. The panel end 39 descends as indicated in FIG. 3 and separates from the member 40. As seen in FIG. 3 a work piece S at about mid height of its stack is substantially horizontal, those pieces S below it having their bulky hem portions H lowered in relation to the remainder of their respective pieces in order thereafter additionally to be able to stack about as many more pieces S above. This greater storage capacity means that an automatic or semi-automatic transfer mechanism 10 may function continuously for longer periods and, conversely, an attendant need not as often have to transfer a relatively small stack.

Figure 5:
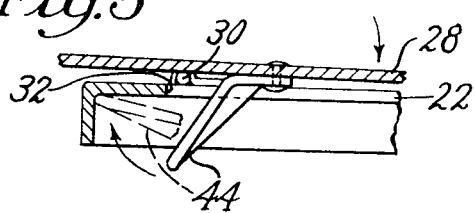
FIG. 5 is a detail view of a stop means for limiting pivoting of one of the work supporting members of the table.
Figure 6:
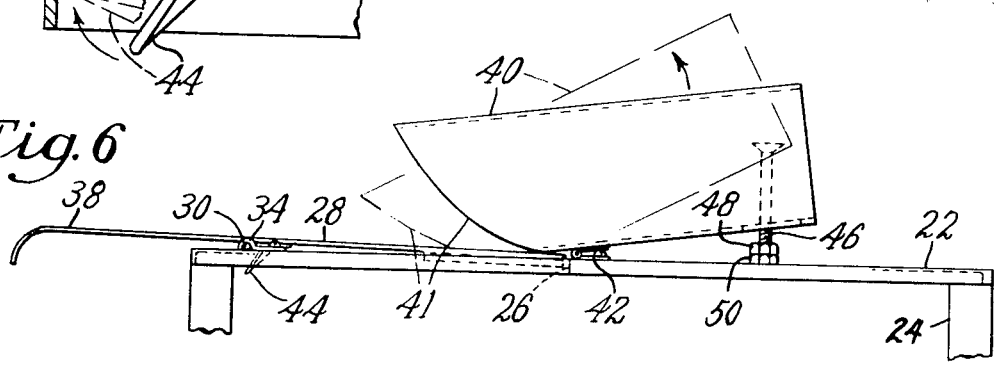
FIG. 6 is a view similar to FIG. 3, somewhat enlarged, and showing the initial positions of the tilting members before receiving a work stack.

For limiting clockwise pivotal movement of the panel 28 an angular abutment 44 (FIG. 4–6) secured thereto is disposed to engage an inside corner of the table top 22 as shown in dash lines in FIG. 5. Also, for adjustably limiting the counterclockwise movement of the member 40, a bolt 46 (FIG. 6) threaded into coaxial nuts 48, 50 the lower of which is secured to the top 22 has its head end extending through a slot 52 (FIG. 4) in the bottom of the member 40. Accordingly at or near the point when the table 20 has received a substantially full load, the head of the bolt 46 will internally engage the member 40 as shown by dash lines in FIG. 6. The abutments 44, 46 are adjusted to prevent a stack from sliding through the opening 26. Though not so shown herein, it will be apparent that, if desired, one or the other of the pivotal means 28 or 40, or both, may be included in a stop-start circuit provided for automatically controlling operation of the transfer means 10 so that overstacking is avoided.

Having thus described my invention, what I claim as new and desire to secure by Letters Patent of the United States is:

1. A work-table for supporting flexible work pieces of uneven mass in stacked relation, corresponding bulkier portions of the respective pieces overlying one another, comprising a fixed table top having an opening therein, a tiltable panel pivotable at one side of the opening and having at least one portion extending into the opening for supporting the bulkier work piece portions, and a tiltable member pivotable at an opposite side of the opening for cooperatively supporting the pieces of a stack as they are partly deposited on the panel, the arrangement being such that, as the stack load increases, the panel and the member, solely under the influence of gravity, responsively rotate in opposite directions respectively to assume a more tilted relation to the table top in order to maintain equilibrium in the stack.

2. A work-table as set forth in claim 1 wherein at least one of the panel and the member is provided with stop means for limiting their relative pivotal movement, said stop means being operative to prevent release of the accumulated stack from between the panel and the member.

3. A work-table as set forth in claim 1 wherein the panel is pivotally secured to the table top for movement about an axis adjacent to and parallel with an edge of said table top opening, an inner portion of the panel extending into said opening and an outer portion of the panel extending outwardly from the table top to urge said inner portion upwardly toward said member to counter the influence of gravity on the superposed bulkier work piece portions.

4. A work-table as set forth in claim 1 wherein the member is in the form of a tube having its axis extending into said opening and disposed centrally to support a portion of the stack.

5. A work-table as in claim 4 wherein the tubular member is provided with a roughened surface to aid in restraining and positioning each bottom-most work piece of a stack.

6. A work-table as in claim 4 wherein the tubular member is hingedly secured to the table top adjacent to an edge of its opening and biased by its own weight to pivot toward parallel relation with the table top.

7. A table for stacking flexible work pieces of uneven mass comprising a fixed, substantially horizontal top, said table top having an opening formed therein of greater size than the pieces to be stacked, a panel pivotally mounted on said top at one side of the opening and biased by gravity toward parallel relation with the table top, and a member pivotally mounted on said top at an opposite side of the opening, the member and the panel respectively extending in part into the opening cooperatively to support a stack of work pieces and being jointly displaceable from horizontal solely by the influence of gravity to maintain its equilibrium.

8. A table as set forth in claim 7 wherein the axes about which the panel and the member respectively pivot are parallel.

9. A work-table for supporting in generally self-leveling manner stacked fabric pieces and the like comprising a rigid table top having an opening larger than the pieces, cooperative work supporting members pivotally secured, respectively, at opposite sides of the opening for tilting about parallel axes adjacent to the table top, adjacent work supporting surfaces of the members being downwardly displaceable solely by gravity to cradle the pieces as they are received, one of the members being biased to urge the other into parallel relation to the top, and means for limiting the tilt of the members into V-relation in response to the weight of the pieces stacked thereon.

* * * * *